United States Patent
Torrini et al.

(10) Patent No.: US 11,227,614 B2
(45) Date of Patent: Jan. 18, 2022

(54) END NODE SPECTROGRAM COMPRESSION FOR MACHINE LEARNING SPEECH RECOGNITION

(71) Applicant: Silicon Laboratories Inc., Austin, TX (US)

(72) Inventors: Antonio Torrini, Austin, TX (US); Sebastian Ahmed, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/898,806

(22) Filed: Jun. 11, 2020

(65) Prior Publication Data

US 2021/0390965 A1 Dec. 16, 2021

(51) Int. Cl.
*G10L 19/02* (2013.01)
*G10L 25/18* (2013.01)

(52) U.S. Cl.
CPC ...... *G10L 19/0204* (2013.01); *G10L 19/0212* (2013.01); *G10L 25/18* (2013.01)

(58) Field of Classification Search
CPC .. G10L 19/0212; G10L 19/0204; G10L 25/18
See application file for complete search history.

(56) References Cited

U.S. PATENT DOCUMENTS

| | | | | |
|---|---|---|---|---|
| 5,630,011 | A * | 5/1997 | Lim | ..... G10L 19/0212 704/205 |
| 6,985,529 | B1 * | 1/2006 | Klivington | ..... H04N 19/60 375/240.2 |
| 9,055,376 | B1 * | 6/2015 | Postelnicu | ..... H04R 3/00 |
| 9,373,320 | B1 * | 6/2016 | Lyon | ..... G10L 21/0308 |
| 10,060,961 | B1 * | 8/2018 | Fleizach | ..... H03M 7/30 |
| 2008/0228476 | A1 * | 9/2008 | Mehrotra | ..... H03M 7/46 704/230 |
| 2009/0063163 | A1 * | 3/2009 | Jeong | ..... G10L 19/093 704/500 |
| 2016/0307576 | A1 * | 10/2016 | Fuchs | ..... G10L 19/0017 |
| 2018/0315433 | A1 * | 11/2018 | Goodwin | ..... G10L 25/18 |
| 2020/0074985 | A1 * | 3/2020 | Clark | ..... G10L 25/18 |

* cited by examiner

*Primary Examiner* — Bryan S Blankenagel
(74) *Attorney, Agent, or Firm* — Nields, Lemack & Frame, LLC

(57) ABSTRACT

A system and method of recording and transmitting compressed audio signals over a network is disclosed. The end node device first converts the audio signal to a spectrogram, which is commonly used by machine learning algorithms to perform speech recognition. The end node device then compresses the spectrogram prior to transmission. In certain embodiments, the compression is performed using Discrete Cosine Transforms (DCT). Furthermore, in some embodiments, the DCT is performed on the difference between two columns of the spectrogram. Further, in some embodiments, a function that replaces values below a predetermined threshold with zeroes in the Encoded Spectrogram is utilized. These functions may be performed in hardware or software.

20 Claims, 9 Drawing Sheets

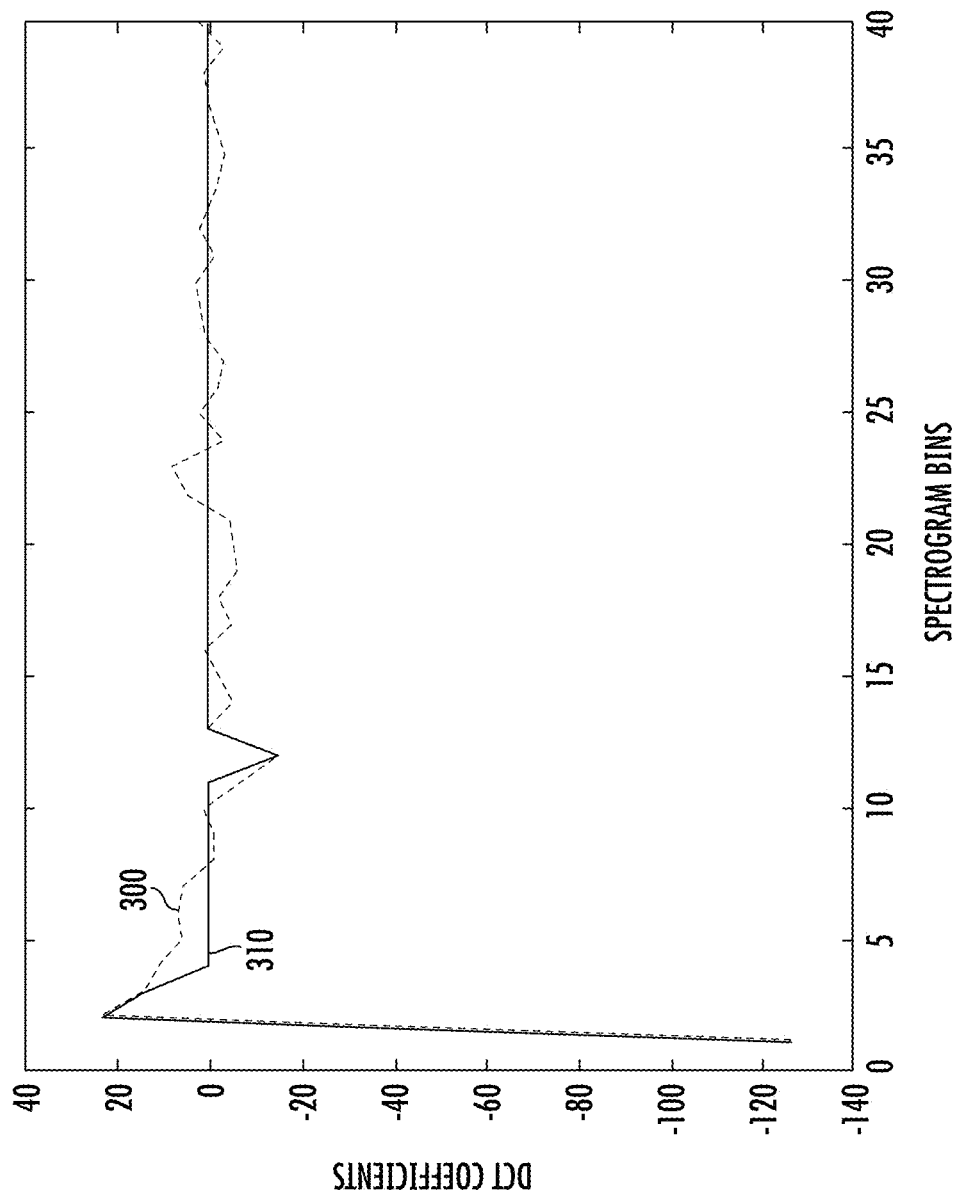

END NODE SPECTROGRAM COMPRESSION FOR MACHINE LEARNING SPEECH RECOGNITION

This disclosure describes systems and methods for compressing spectrograms at an end node for transmission to a remote server.

BACKGROUND

It is common for some end node devices to record sound and detect keywords. In some cases, the end node device is only capable of detecting a limited number of keywords. In other cases, the end node device may be more powerful and capable of detecting many keywords. The end node device may have an audio channel that includes a microphone, an analog to digital converter (ADC) and some additional processing. Under some conditions, the audio channel is always active and ready to receive and process commands.

However, in some cases, the end node devices typically lack the processing power to perform true speech recognition. Therefore, many end node devices must transmit the audio signal to a remote server, which may be disposed in the cloud, via the internet, where the audio signal is decoded by means of a more advanced algorithm, such as a Machine Learning solution. In other cases, more powerful end node devices may still be required to transmit the audio signal to a remote server, for validation or for data collection purposes.

In other words, some end node devices have the ability to recognize a wake word or phrase, such as "Siri", "Alexa", "Hey Google", "OK Google" and others. Once awake, the end node device will record the incoming audio. However, in some embodiments, the end node device is unable to decode this incoming audio signal. Consequently, the audio signal is then transmitted from the end node device via a network connection to another device for further processing. In other embodiments, the end node device can decode this incoming signal, but still transmits the audio signal to another device to other purposes.

The transmission of these audio signals over a network, either wired or wireless, requires both bandwidth and power that may be prohibitively large for battery powered end node devices. For example, a mono 8 kHz audio signal requires 16 KB/s or 128 Kbps of bandwidth over the network to transmit this information.

Therefore, it would be advantageous if there were a method of compressing the incoming audio signal prior to transmission. Further, it would be beneficial if the compression algorithm uses the same data type that is used by the server to decode the audio signal.

SUMMARY

A system and method of recording and transmitting compressed audio signals over a network is disclosed. The end node device first converts the audio signal to a spectrogram, which is commonly used by machine learning algorithms to perform speech recognition. The end node device then compresses the spectrogram prior to transmission. In certain embodiments, the compression is performed using Discrete Cosine Transforms (DCT). Furthermore, in some embodiments, the DCT is performed on the difference between two columns of the spectrogram. Further, in some embodiments, a function that replaces values below a predetermined threshold with zeroes in the Encoded Spectrogram is utilized. These functions may be performed in hardware or software.

According to one embodiment, a device for detecting an audio signal and transmitting a compressed spectrogram to a remote server is disclosed. The device comprises a microphone; a network interface; a controller in communication with a microphone to receive digitized audio samples; wherein the controller is configured to: receive the plurality of digitized audio samples; use the plurality of digitized audio samples to create a spectrogram; generate a first column of an Encoded Spectrogram by applying a spectral conversion algorithm on a first column of the spectrogram; generate each subsequent column of the Encoded Spectrogram by applying the spectral conversion algorithm to a difference between a respective column of the spectrogram and values that correspond to a previous column of the spectrogram; and transmit the Encoded Spectrogram to the remote server. In certain embodiments, the values that correspond to the previous column are the values in the previous column of the spectrogram. In certain embodiments, the controller is further configured to: create a Reconstructed Spectrogram, wherein a $N^{th}$ column of the Reconstructed Spectrogram is generated by performing an inverse spectral conversion algorithm on a sum of a first N columns of the Encoded Spectrogram; and the values that correspond to the previous column are the values in the previous column of the Reconstructed Spectrogram. In certain embodiments, the spectral conversion algorithm comprises a Discrete Cosine Transform. In some embodiments, the controller is further configured to: replace a value in the column of the Encoded Spectrogram with zero if the value is less than a predefined threshold using a Nulland-Quantize_Coefficient function. In certain embodiments, a plurality of values in the Encoded Spectrogram comprise a value of 0; and the device further compresses the Encoded Spectrogram prior to transmitting to the remote server by removing at least a portion of the plurality of values that comprise a value of 0. In certain embodiments, zero run-length encoding is used to compress the Encoded Spectrogram.

According to another embodiment, a method of detecting an audio signal and transmitting a compressed spectrogram to a remote server is disclosed. The method comprises receiving a plurality of digitized audio samples; using the plurality of digitized audio samples to create a spectrogram; generating a first column of an Encoded Spectrogram by applying a spectral conversion algorithm on a first column of the spectrogram; generating each subsequent column of the Encoded Spectrogram by applying the spectral conversion algorithm to a difference between a respective column of the spectrogram and values that correspond to a previous column of the Spectrogram; and transmitting the Encoded Spectrogram to the remote server. In certain embodiments, the values that correspond to the previous column are the values in the previous column of the spectrogram. In certain embodiments, the method further comprises: creating a Reconstructed Spectrogram, wherein a $N^{th}$ column of the Reconstructed Spectrogram is generated by performing an inverse spectral conversion algorithm on a sum of a first N columns of the Encoded Spectrogram; and the values that correspond to the previous column are the values in the previous column of the Reconstructed Spectrogram. In certain embodiments, the spectral conversion algorithm comprises a Discrete Cosine Transform. In some embodiments, the method further comprises: replacing a value in the column of the Encoded Spectrogram with zero if the value is less than a predefined threshold using a NullandQuantize_Coefficient function. In certain embodiments, a plurality of values in the Encoded Spectrogram comprise a value of 0; and the method further comprises: compressing the Encoded Spectrogram prior to transmitting to the remote server by removing at least a portion of the plurality of values that comprise a value of 0.

According to another embodiment, software program, disposed on a non-transitory storage media, comprising instructions, is disclosed. The instructions, when executed by a processing unit dissed on a device having a microphone, enable the device to: receive the plurality of digitized audio samples; use the plurality of digitized audio samples to create a spectrogram; generate a first column of an Encoded Spectrogram by applying a spectral conversion algorithm on a first column of the spectrogram; generate each subsequent column of the Encoded Spectrogram by applying the spectral conversion algorithm to a difference between a respective column of the spectrogram and values that correspond to a previous column of the Spectrogram; and transmit the Encoded Spectrogram to the remote server. In certain embodiments, the software program comprises instructions that enable the device to: create a Reconstructed Spectrogram, wherein a $N^{th}$ column of the Reconstructed Spectrogram is generated by performing an inverse spectral conversion algorithm on a sum of a first N columns of the Encoded Spectrogram; and wherein the values that correspond to the previous column are the values in the previous column of the Reconstructed Spectrogram. In certain embodiments, the software program comprises instructions that enable the device to: replace a value in the column of the Encoded Spectrogram with a zero if the value is less than a predefined threshold using a NullandQuantize_Coefficient function. In certain embodiments, a plurality of values in the Encoded Spectrogram comprise a value of 0; and wherein the software program further comprises instructions that enable the device to: compress the Encoded Spectrogram prior to transmitting to the remote server by removing at least a portion of the plurality of values that comprise a value of 0. In certain embodiments, the spectral conversion algorithm comprises a Discrete Cosine Transform.

BRIEF DESCRIPTION OF THE DRAWINGS

For a better understanding of the present disclosure, reference is made to the accompanying drawings, in which like elements are referenced with like numerals, and in which:

FIG. 10 shows the DCT coefficients for the first column of the spectrogram.

DETAILED DESCRIPTION

Figure 1:
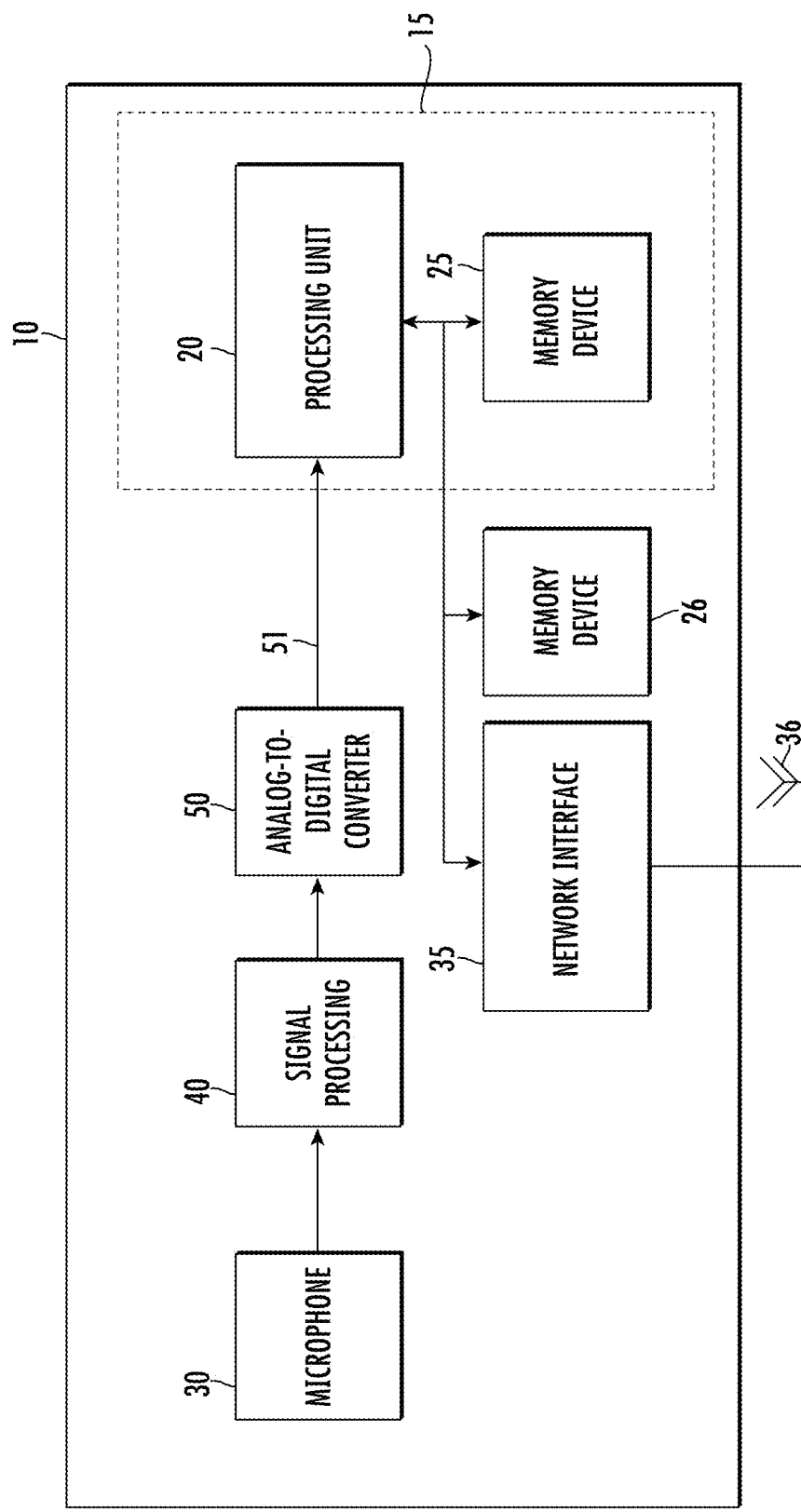
FIG. 1 is a block diagram of a device that may be used to perform the method described herein.

FIG. 1 shows a device that may be used to perform the spectrogram compression technique described herein. The device 10 has a controller 15. In one embodiment, the controller 15 comprises a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the device 10. The instructions contained on this second computer readable non-transitory media may be downloaded onto the memory device 25 to allow execution of the instructions by the device 10.

In another embodiment, the controller 15 may be one or more configurable or application specific integrated circuits which are capable of performing the actions described herein. In yet another embodiment, the controller 15 may include both a processing unit 20, a memory device 25 and one or more integrated circuits.

The device 10 also includes a microphone 30. To minimize power consumption, the microphone 30 may be a micro-electro-mechanical system (MEMS) device. In other embodiments, the microphone 30 may be an analog device.

The microphone 30 may be in communication with a signal processing circuit 40. The signal processing circuit 40 may include amplifiers, filters, and other components to improve the quality of the output from the microphone 30. The output of the signal processing circuit 40 may be presented to an analog to digital converter (ADC) 50. The ADC 50 may have a sample rate of 8K or 16K samples per second, although other sample rates may be used as well. In other words, in one second, the ADC 50 will generate 16,000 digitized audio samples.

While the processing unit 20, the memory device 25, the microphone 30, the signal processing circuit 40 and the ADC 50 are shown in FIG. 1 as separate components, it is understood that some or all of these components may be integrated into a single electronic component. Rather, FIG. 1 is used to illustrate the functionality of the device 10, not its physical configuration.

The device 10 also includes a network interface 35, which may be a wireless network interface that includes an antenna 36. The network interface 35 may support any wireless network protocol. The network interface 35 is used to allow the device 10 to communicate with other devices disposed on the network.

The network interface 35 includes a radio circuit. This radio circuit is used to process the incoming signal and convert the wireless signals to digital signals.

The device 10 may include a second memory device 26. Data that is received from the network interface 35 or is to be sent via the network interface 35 may also be stored in the second memory device 26. This second memory device 26 is traditionally a volatile memory.

Although not shown, the device 10 also has a power supply, which may be a battery or a connection to a permanent power source, such as a wall outlet.

The output of the ADC 50, which is referred to as the digitized audio sample 51, is an input to the controller 15. The controller 15 may operate on these digitized audio samples 51 to create the compressed spectrograms, as described below.

Further, the conversion of audio signals to digitized audio samples may be performed in a number of ways. For example, in certain embodiments, the output of the microphone 30 may be one or more digital signals. These may be transmitted using a serial interface, such as I2S or PDM. In these embodiments, the ADC 50 and the signal processing circuit 40 may be omitted. In other embodiments, the controller 15 may include an internal ADC so that it receives analog signals from the microphone 30. In all of these embodiments, the controller 15 is in communication with the microphone 30 (either directly or via one or more intervening components) and ultimately receives digitized audio samples 51.

Further, while FIG. 1 shows one microphone 30, it is understood that an array of microphones may also be utilized.

In certain embodiments, digitized audio samples representing at least one second of data are captured. Assuming a sample rate of 16K samples per second, one second of data may comprise over 16,000 digitized audio samples.

Figure 2:
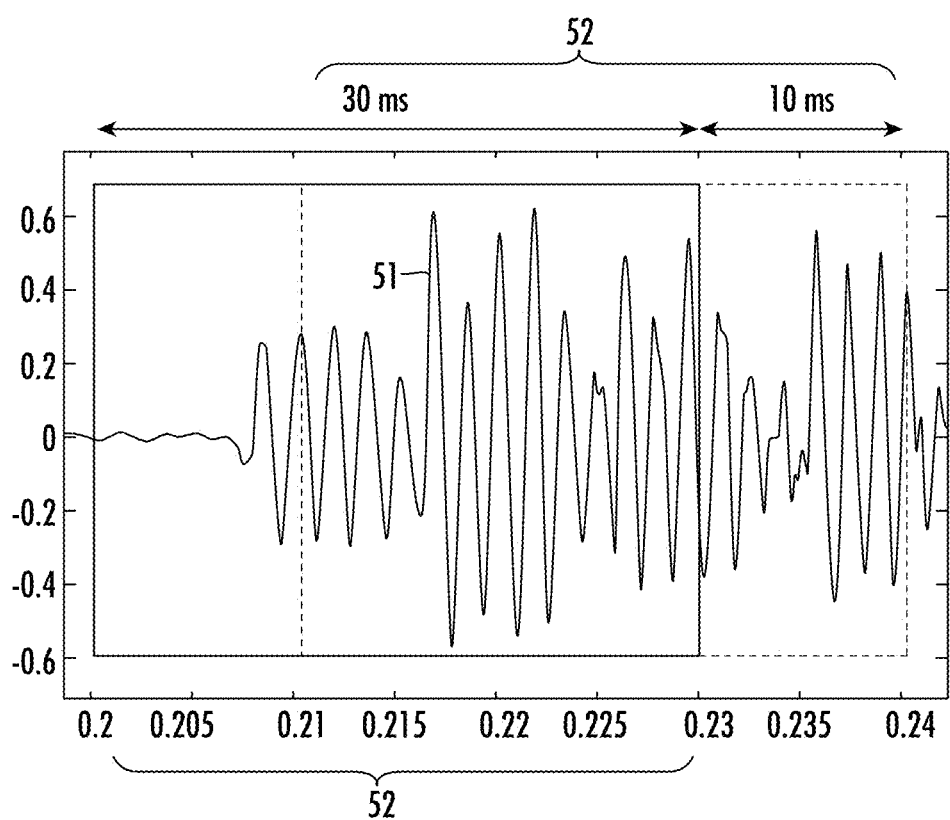
FIG. 2 shows digitized audio samples used by the device to create a compressed spectrogram.

As shown in FIG. 2, these digitized audio samples 51 are binned into a plurality of overlapping segments 52. For example, in certain embodiments, each segment may represent a duration of 30 milliseconds of data. Each segment may be offset 10 milliseconds after the previous segment. In other words, the first segment contains data from time 0 to 30 milliseconds; the second segment contains data from time 10 milliseconds to 40 milliseconds; and so on. In this way, 98 segments may be created from one second of data. Of course, more or fewer segments may be created. Additionally, the offset and duration of the segments 52 may be varied. For example, the offset between adjacent segments 52 may be 10 to 20 milliseconds, while the duration of each segment 52 may be between 20 and 60 milliseconds. Of course, other values may be used.

Figure 3:
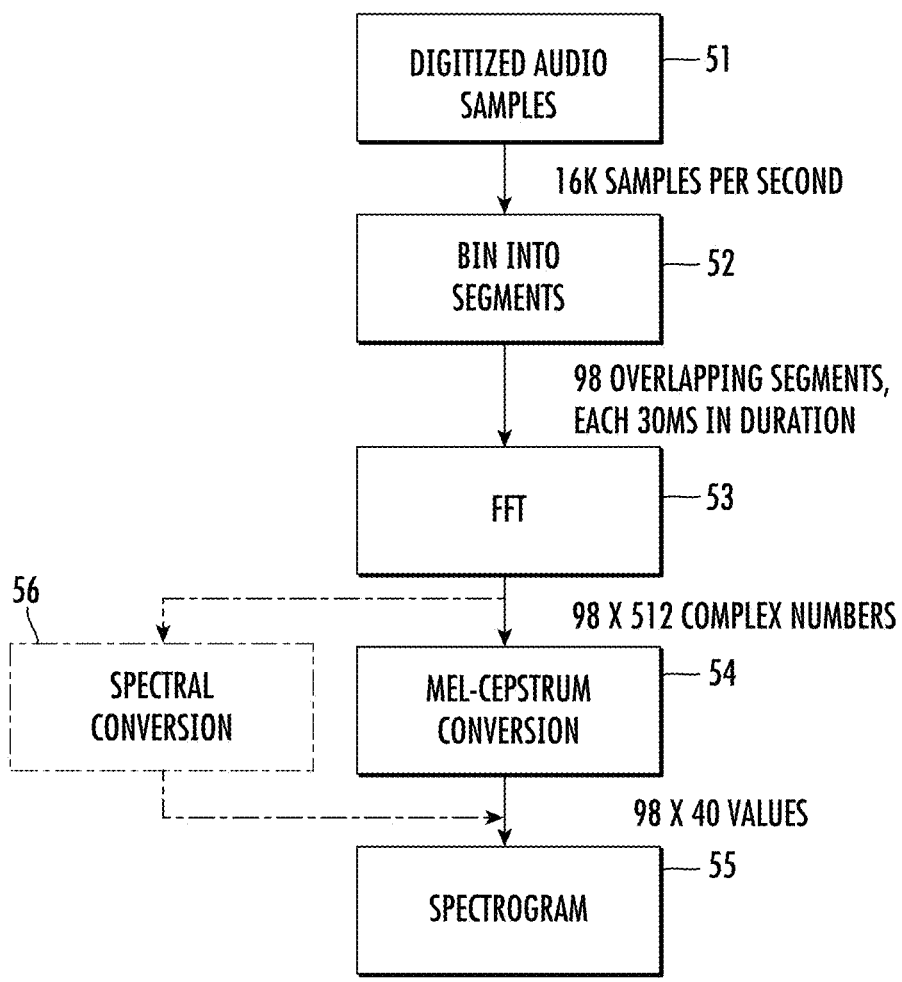
FIG. 3 shows the process to create a spectrogram from the digitized audio samples of FIG. 2.
Figure 4:
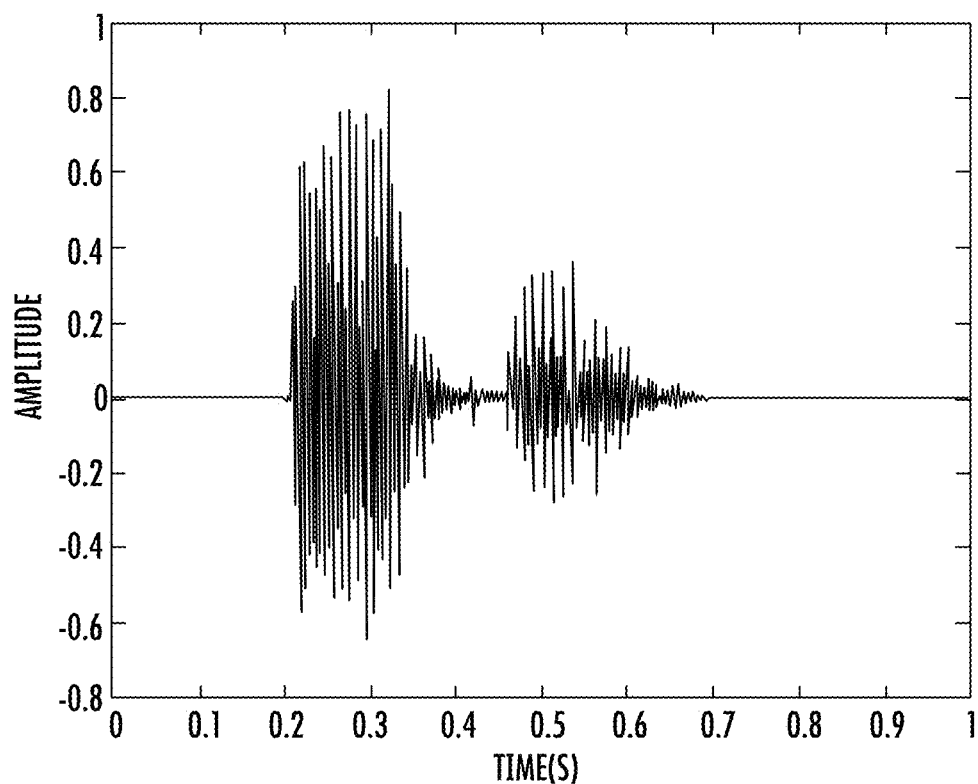
FIG. 4 shows a second set of digitized audio samples.
Figure 5:
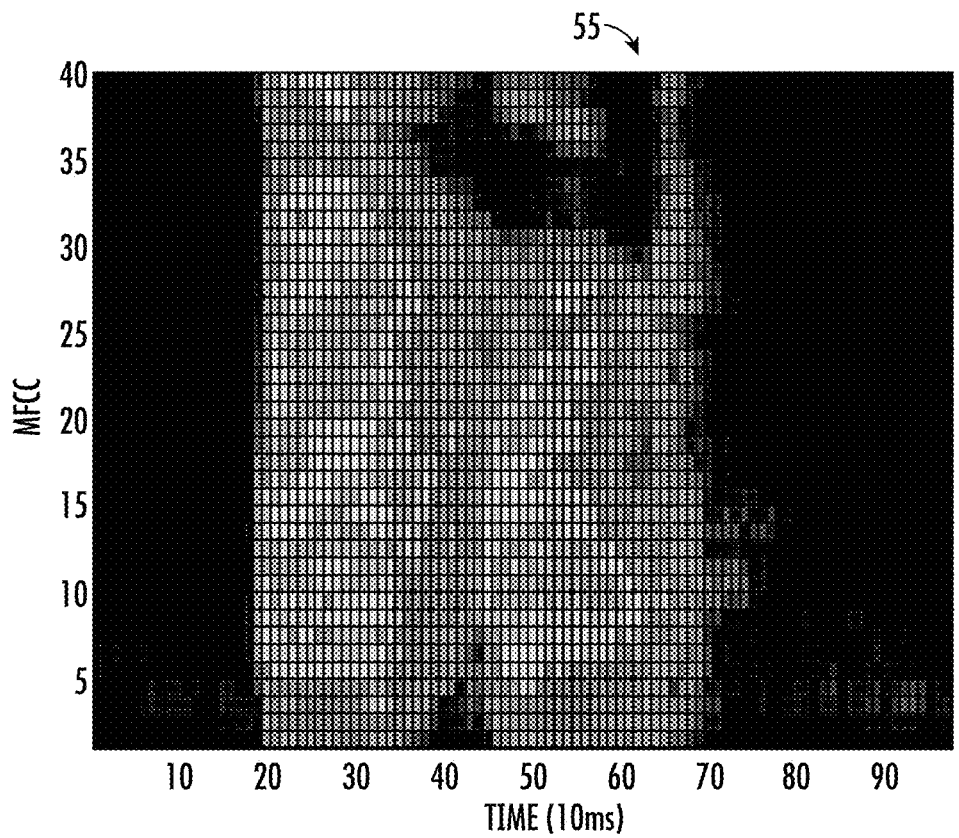
FIG. 5 shows the spectrogram corresponding to the digitized audio samples of FIG. 4.

FIG. 3 shows the process to create a spectrogram. FIG. 4 shows another illustration of digitized audio samples 51. FIG. 5 shows the spectrogram 55 created from the digitized audio samples of FIG. 4.

As shown in FIG. 3, after binning the digitized samples into segments, the controller 15 then performs a fast Fourier Transform (FFT) 53 on each of these segments, as shown in FIG. 3. The output of the FFT 53 is a set of complex numbers where each complex number represents the amplitude and phase of a particular frequency. Specifically, the amplitude at a particular frequency is represented by the square root of the squares of the real and imaginary components. The phase of that particular frequency is given as the arctangent of the imaginary component divided by the real component. In certain embodiments, there are 512 frequencies that are analyzed. In other embodiments, more or fewer frequencies may be calculated.

The output from the FFT 53 may then used to create Mel-frequency cepstral scale. This may be done by utilizing the output of the FFT 53 as the input to a set of forty overlapping triangular windows. The output from the Mel-cepstral conversion 54 is a set of values, where each value represents the power associated with a certain frequency range. In certain embodiments, there may be 40 values. In other embodiments, there may be 20 values. These outputs may be referred to as Mel-ceptral information. These frequency ranges are created based on a perceptual scale of pitches as judged by the human ear to be equidistant from one another. The result is that, at frequencies of about 1000 Hz and below, the Mel scale is approximately the same as the actually frequency. At higher actual frequencies, the resulting Mel frequency is typically lower than the actual frequency. Further, these frequency ranges have been empirically found to be suitable for machine learning.

Alternatively, a Mel-frequency cepstral scale is not used. Rather, each value for the segment may be obtained by averaging one or more complex numbers output by the FFT. The outputs from the spectral conversion 56 may be a set of values, where each value represents a relative amplitude of a range of frequencies. These outputs may be referred to as spectral information. This may result in lower performance but may be simpler to implement.

Thus, after the processing described above, for 1 second of audio samples, there are 98 different segments, where each segment is represented by 40 values. This is referred to as a spectrogram 55. An example of a spectrogram 55 is shown in FIG. 5. The spectrogram of FIG. 5 corresponds to the audio input shown in FIG. 4.

However, the spectrogram 55 may differ in size. For example, a spectrogram 55 may be generated every 500 milliseconds. In this case, there would be 49 bins, instead of 98. Additionally, the final output may be less than 40 values, as noted above. For example, in certain embodiments, the spectrogram may be of dimensions 49×20.

Thus, through these conversions, one second of digitized audio samples can be reduced to 98×40 pieces of data, where each piece of data may be 8, 16 or 32 bits.

However, the spectrogram of FIG. 5 can be further compressed by the controller 15 before being transmitted by the network interface 35.

As described above, a column of the spectrogram 55 represents frequency data corresponding to N milliseconds of digitized audio samples. Further, the adjacent column also represents frequency data corresponding to N milliseconds of digitized audio, where M milliseconds of those N milliseconds are also part of the previous column. In the example described above, N is 30 milliseconds and M is 20 milliseconds. Thus, there is often a great deal of commonality between adjacent columns in the spectrogram 55. Further, audio samples, especially those associated with voice tend to have high short-term correlation. These facts may be exploited to compress the spectrogram prior to transmission.

In the following description, there are three different arrays. The first is referred to as Spectrogram, which is the output from the process shown in FIG. 3. The second array is referred to as Encoded Spectrogram, which represents the compressed spectrogram that is to be transmitted by the network interface 35. The third array is referred to as the Reconstructed Spectrogram. This Reconstructed Spectrogram is generated from the Encoded Spectrogram, as described in more detail below.

These three arrays are used to create a compressed spectrogram that is suitable for transmission via the network interface 35. This is done by applying a spectral conversion algorithm to the Spectrogram. In certain embodiments, this spectral conversion algorithm may be a Discrete Cosine Transform. In other embodiments, a Fourier related transform may be employed. These Fourier related transforms include Hartley transforms, discrete Fourier transforms and others. Alternatively, wavelet transforms may be employed.

In this example, it is assumed that the spectral conversion algorithm is a Discrete Cosine Transform (DCT), however, as noted above, the disclosure is not limited to this embodiment. The output of a DCT may be expressed as:

$$X_k = \sum_{n=0}^{N-1} x_n \cos\left[\frac{\pi}{N}\left(n + \frac{1}{2}\right)k\right]$$

where $x_n$ is the value in each row of the column of the Spectrogram 100 and $X_k$ is the resulting output. In this example, the software or hardware process that performs this operation may be referred to as the DCT function. Typically, much of the energy in a DCT is concentrated in a few of the coefficients. Thus, in certain embodiments, each of the resulting $X_k$ values is compared against a predefined threshold. If the value of $X_k$ is less than this threshold, $X_k$ is set to zero. Additionally, the resulting $X_k$ values may be quantized. The software or hardware process that performs this function may be referred to as the NullandQuantize_Coefficient function. The output of the NullandQuantize_Coefficient function is stored in the Encoded Spectrogram 110. In another embodiment, the NullandQuantize_Coefficient function is not employed and every output of the DCT function is stored in the Encoded Spectrogram.

Having defined the basic algorithm, the following shows the process of creating the Encoded Spectrogram.

Figure 6:
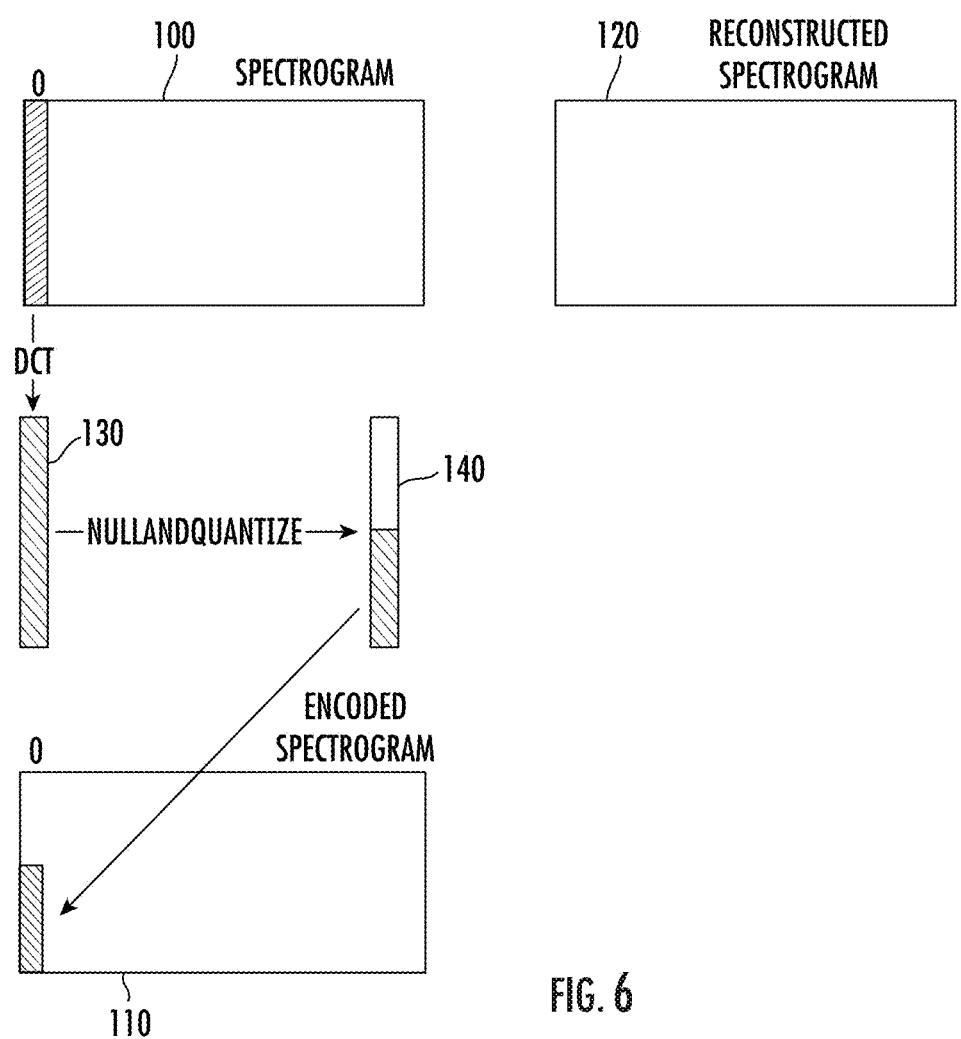
FIG. 6 shows a first step in the creation of an Encoded Spectrogram.

First, as shown in FIG. 6, the first column of the Spectrogram 100 is selected and a DCT transformation is performed on this first column to generate a result 130. As stated above, following the DCT transformation, the result 130 may be used as inputs to the NullandQuantize_Coefficient function, which replaces coefficients having a value below a certain threshold with a zero value. The NullandQuantize_Coefficient function may also quantize the non-zero values. The result 140 of these operations, is then stored in the first column of the Encoded Spectrogram 110, as shown.

As described above, in most instances, there is a large degree of short-term correlation between columns of the Spectrogram 100. In other words, there is little difference between adjacent columns of the Spectrogram 100.

Figure 7:
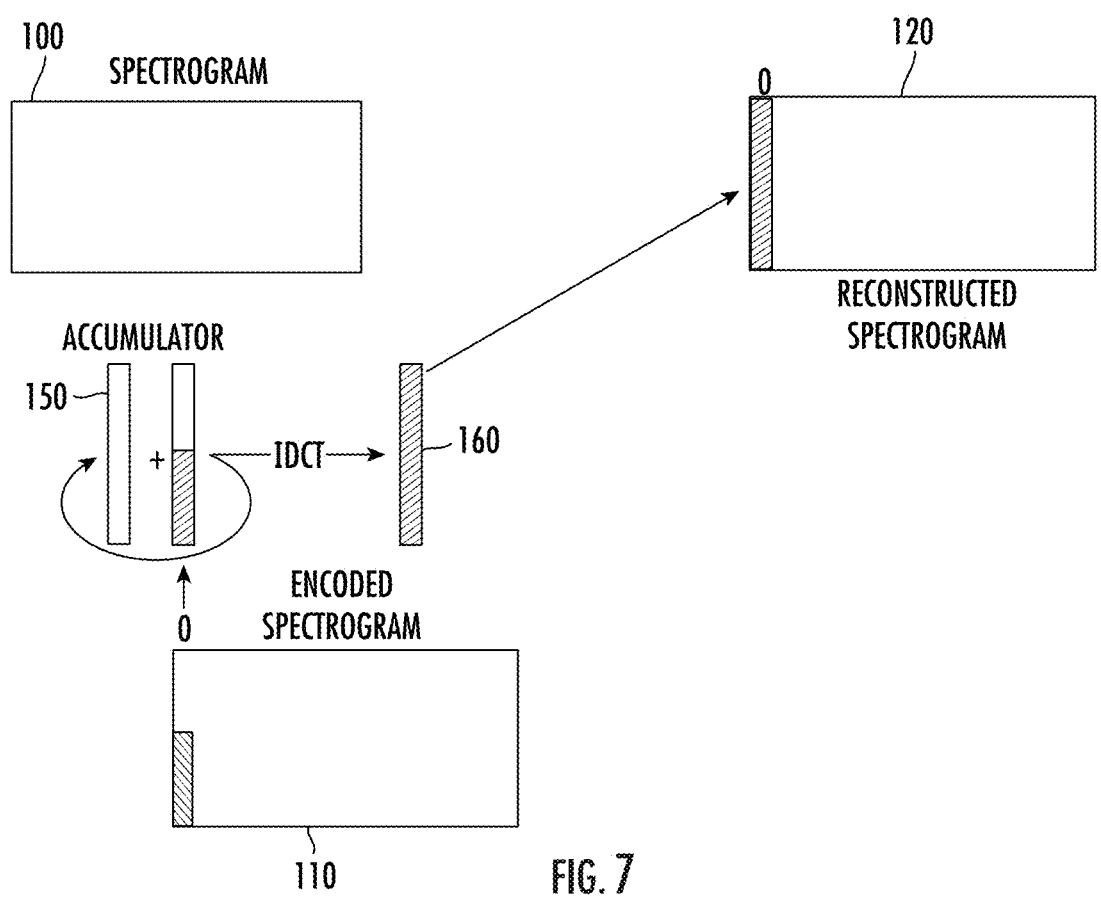
FIG. 7 shows a second step in the creation of an Encoded Spectrogram.

This is exploited in the following sequence. Next, as shown in FIG. 7, the previously stored column (i.e. column 'N') of the Encoded Spectrogram 110 is retrieved. The values of this retrieved column are then element-wise added to an Accumulator array 150. At initialization, the Accumulator array 150 is reset to zeros. Further, the Accumulator array is reset every time a full column (i.e. FIG. 6) is created. The Accumulator array 150 is used to store the sum of the first N columns of the Encoded Spectrogram 110. In other words, the Accumulator array is calculated as follows:

$$\text{Accumulator Array} = \sum_{n=0}^{N} EncodedSpectrogram[n]$$

An Inverse Discrete Cosine Transform (IDCT) is then performed on the Accumulator array 150. The IDCT function may be performed in hardware or software. The result of this IDCT is the reconstructed column 160, which is then stored in the corresponding column of the Reconstructed Spectrogram 120. The Reconstructed Spectrogram 120 represents the spectrogram that will be generated by the remote server, based on the transmitted Encoded Spectrogram 110.

Figure 8:
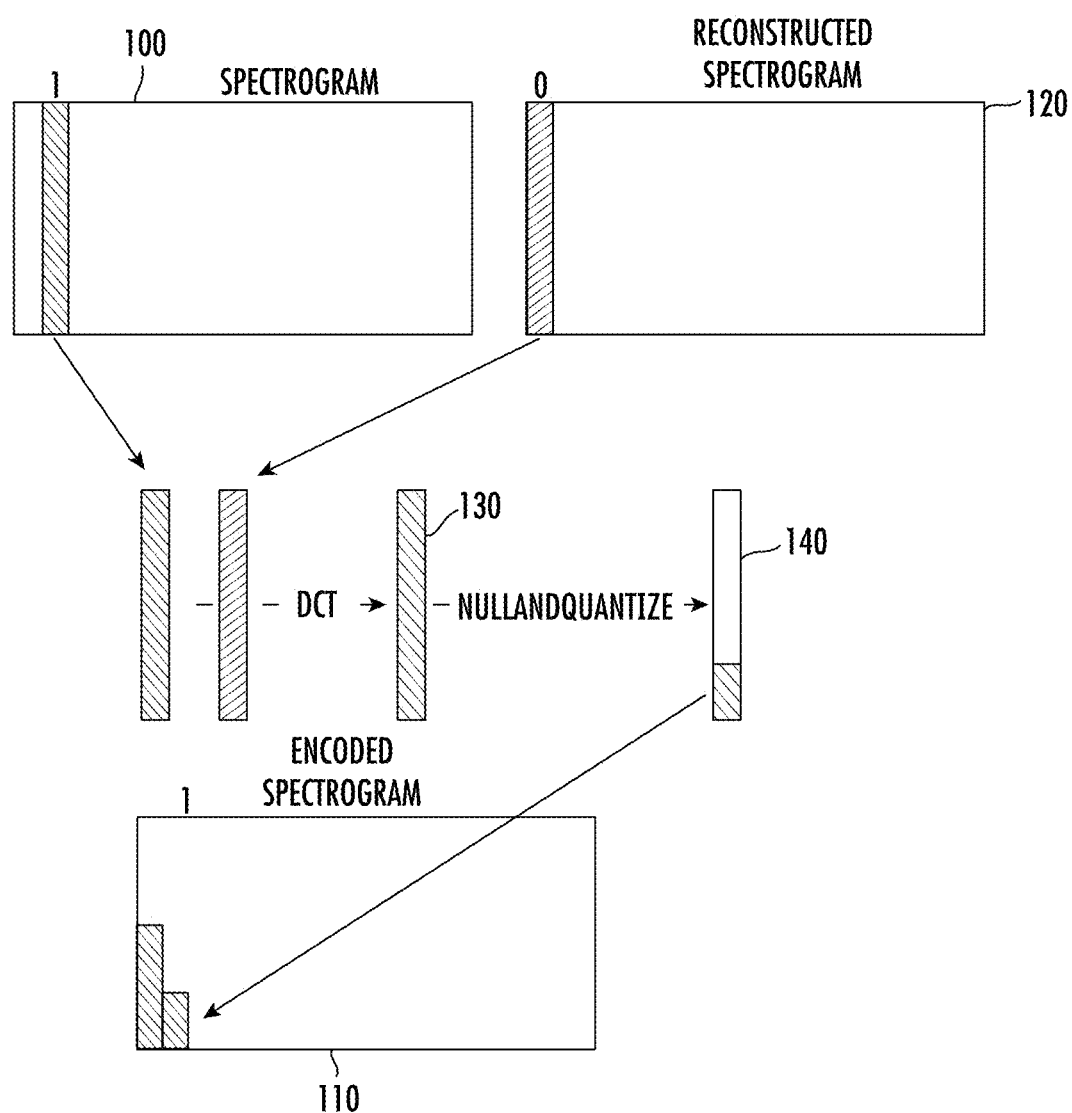
FIG. 8 shows a third step in the creation of an Encoded Spectrogram.

Finally, as shown in FIG. 8, the process continues by generating the second, and subsequent columns of the Encoded Spectrogram 110. First, the next column (N+1) of the Spectrogram 100 is retrieved. The previous column (N) of the Reconstructed Spectrogram 120 is subtracted from the next column (N+1) of the Spectrogram 100. In other words, Difference=Spectrogram(N+1)−ReconstructedSpectrogram(N)

A DCT function is performed on this difference to generate a result 130. As stated above, following the DCT function, the result 130 may be used as the input to the NullandQuantize_Coefficient function, which replaces coefficients having a value below a certain threshold with a zero value. The NullandQuantize_Coefficient function may also quantize the non-zero values. The result 140 of these operations, is then stored in the next column of the Encoded Spectrogram 110, as shown.

The processes shown in FIGS. 7 and 8 are then repeated until the entire Encoded Spectrogram 110 is created. In certain embodiments, the process shown in FIG. 6 may be repeated periodically to improve reliability. Since all columns are based on differences, lost packets may cause errors. Periodically sending an entire column (such as is shown in FIG. 6) allows the server to re-synchronize.

Figure 9:
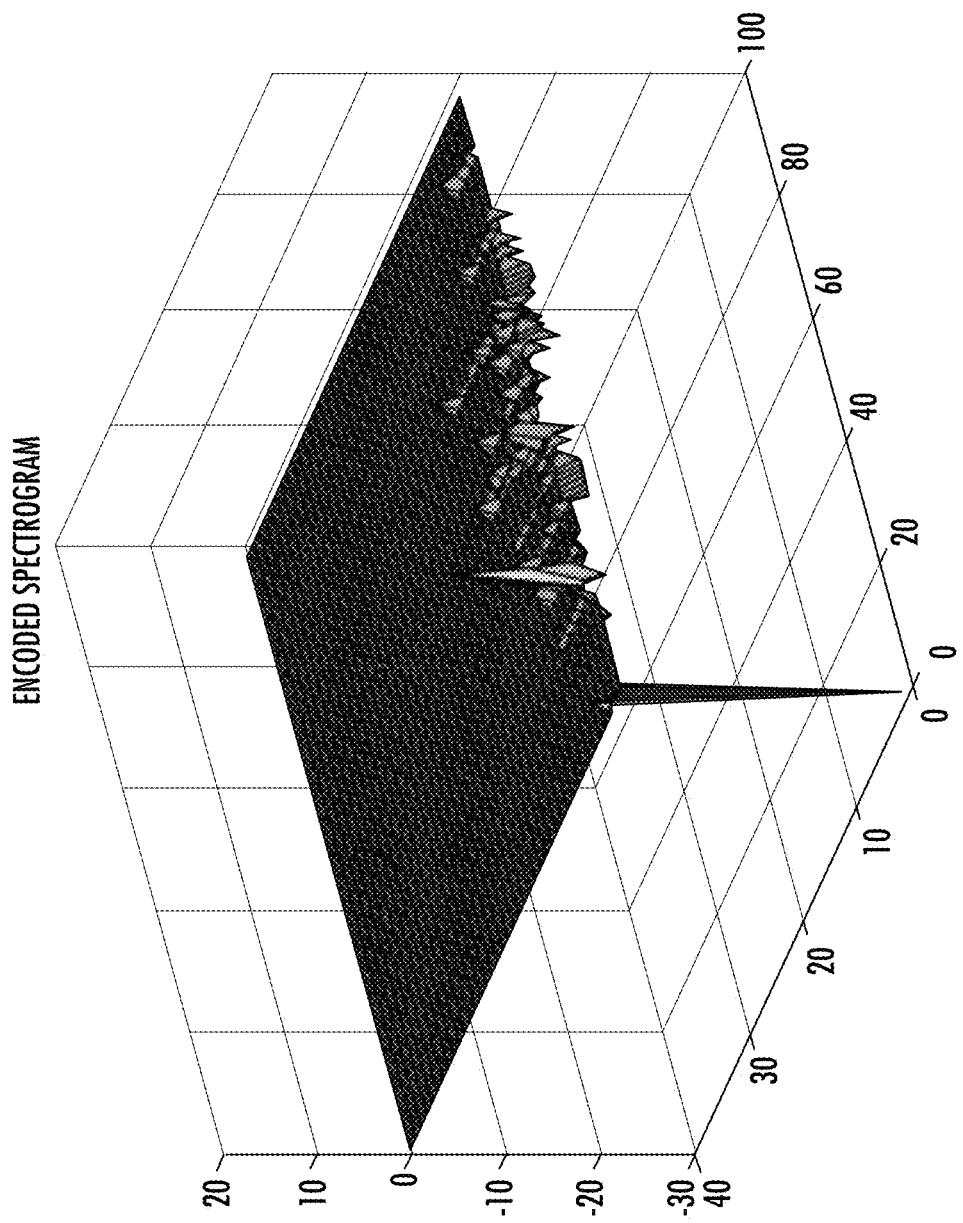
FIG. 9 shows the resultant Encoded Spectrogram shown as a three-dimensional plot.

FIG. 9 shows a graphical representation of the Encoded Spectrogram 110 corresponding to the digitized audio samples from FIG. 4. Note that most of the values in the array are zero. The only regions having large values are at 0 ms, which corresponds to the initial column, and 200 ms, which corresponds to the start of the actual speech in the spectrogram (see FIG. 4).

Since most of the Encoded Spectrogram comprises values of 0, the Encoded Spectrogram 110 may be further compressed prior to transmission. For example, zero run-length encoding may be performed. In this embodiment, each time a zero is encountered, it is replaced with two values; the first is the value "0" and the second is the number of zeros that are in the run. For example, the values [10 5 3 0 0 0 1 0 0 0 0 0 0 0] would be transmitted as [10 5 3 0 3 1 0 8]. Thus, in this example, zero run-length encoding reduces the transmitted data by almost 50%.

FIG. 10 shows the first column of the spectrogram shown in FIG. 9. Line 300 represents the values of the first column before the NullandQuantize_Coefficient function is executed. Line 310 represents the values of the first column, as stored in the Encoded Spectrogram 110. Note that after the twelfth element, all of the remaining coefficients are zero. Thus, the first twelve elements provide all of the data needed to reconstruct the Spectrogram. Thus, by only transmitting the values at the beginning of each column, the compression may be increased by approximately 3×.

When these techniques are all applied, the compression may be 16× with negligible loss and 32× with minimal loss.

Of course, other variations of this procedure may be used. For example, the method of encoding the sequence consecutive zeros in each column may be done differently.

Additionally, note that in the process shown in FIGS. 6-8, the Reconstructed spectrogram 120 is used to create the values in the Encoded Spectrogram 110. This ensures that the error introduced when the remote server decodes the Encoded Spectrogram is minimized. Thus, in this embodiment, only the first column is encoded by itself, while the remaining encoding process operate on the difference between adjacent columns.

In another embodiment, the Reconstructed Spectrogram is not used. Rather, the difference function, which is shown in FIG. 8, is computed using two columns from the Spectrogram 100. In other words, in this embodiment, $$\text{Difference} = \text{Spectrogram}(N+1) - \text{Spectrogram}(N)$$

Since the reconstructed spectrogram is not identical to the original spectrogram, this approach introduces error, which becomes greater for each column. Thus, in this embodiment, it may be necessary to create an encoded column (as opposed to an encoded difference) periodically in the Encoded Spectrogram 110. For example, every tenth column in the Encoded Spectrogram 110 may be generated using the technique shown in FIG. 6. This approach may not generate the same compression ratio as that described above, but it also reduces the processing burden on the device 10, as there is no need to perform the decode process shown in FIG. 7.

Thus, in summary, the device 10 performs the following steps. First, a Spectrogram 100 is created from a plurality of digitized audio samples. This may be done in a variety of ways, as described above. Next, the device 10 encodes the first column of the Spectrogram 100 by applying a spectral conversion algorithm to create the first column of the Encoded Spectrogram 110. In certain embodiments, a NullandQuantize_Coefficient function is then applied to the first column of the Encoded Spectrogram 110, which changes any value in the first column which is less than a predetermined threshold to 0. The NullandQuantize_Coefficient function may also quantize the non-zero values.

The device 10 then generates subsequent columns of the Encoded Spectrogram 110 by using the difference between the respective column of the Spectrogram 100 and values that correspond to the previous column of the Spectrogram 100. As explained above, in certain embodiments, the values that correspond to the previous column are the actual values in the previous column of the Spectrogram 100. In other embodiments, the values that correspond to the previous column are the values in the respective column of the Reconstructed Spectrogram 120. The spectral conversion algorithm is then applied to this difference to create the next column of the encoded spectrogram 110. In certain embodiments, a NullandQuantize_Coefficient function is then applied to the column of the Encoded Spectrogram 110. Various quantization schemes may be used by the NullandQuantize_Coefficient function, including floating point, such as FP16, INT8 and INT4. This process is repeated for all columns in the Encoded Spectrogram 110. This Encoded Spectrogram 110 is then transmitted over the network interface 35 to a remote server, which performs speech recognition. The device 10 may further compress the Encoded Spectrogram 110 by only transmitting the non-zero values, such as through the use of zero run-length encoding.

It is noted that the Encoded Spectrogram may be transmitted at any desired time interval. For example, one column of the Encoded Spectrogram 110 may be transmitted every ten milliseconds. In other words, the latency associated with this technique may be minimized by continuous transmission of each column as it is generated. In other embodiments, a plurality of columns may be transmitted less frequently.

The present system and method have many advantages. First, it is noted that most remote servers utilize Machine Learning speech recognition algorithms that use a spectrogram to decipher the spoken words. By utilizing spectrograms in the device 10, the remote servers do not need to perform this transformation on the incoming data.

Second, the spectrogram is more readily compressed, with minimal loss. It was been estimated that compression of about 64× is achievable in this approach. Thus, the required bandwidth is only 2 kbps. This is compared to about 128 Kbps for uncompressed mono 8 Hz audio samples, or 8 kps for a high-compression voice codec. Furthermore, many devices have DCT/IDCT hardware blocks that may be leveraged to perform these functions.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device for detecting an audio signal and transmitting a compressed spectrogram to a remote server, comprising:
 a microphone;
 a network interface;
 a controller in communication with a microphone to receive digitized audio samples;
 wherein the controller is configured to:
  receive the plurality of digitized audio samples;
  use the plurality of digitized audio samples to create a spectrogram;
  generate a first column of an Encoded Spectrogram by applying a spectral conversion algorithm on a first column of the spectrogram;
  generate each subsequent column of the Encoded Spectrogram by applying the spectral conversion algorithm to a difference between a respective column of the spectrogram and values that correspond to a previous column of the spectrogram; and
  transmit the Encoded Spectrogram to the remote server.

2. The device of claim 1, wherein the values that correspond to the previous column are the values in the previous column of the spectrogram.

3. The device of claim 1, wherein the controller is further configured to:
  create a Reconstructed Spectrogram, wherein a $N^{th}$ column of the Reconstructed Spectrogram is generated by performing an inverse spectral conversion algorithm on a sum of a first N columns of the Encoded Spectrogram; and wherein the values that correspond to the previous column are the values in the previous column of the Reconstructed Spectrogram.

4. The device of claim 1, wherein the spectral conversion algorithm comprises a Discrete Cosine Transform.

5. The device of claim 1, wherein the controller is further configured to:
  replace a value in the column of the Encoded Spectrogram with zero if the value is less than a predefined threshold using a NullandQuantize_Coefficient function.

6. The device of claim 5, wherein the controller is further configured to:
  create a Reconstructed Spectrogram, wherein a $N^{th}$ column of the Reconstructed Spectrogram is generated by performing an inverse spectral conversion algorithm on a sum of a first N columns of the Encoded Spectrogram; and wherein the values that correspond to the previous column are the values in the previous column of the Reconstructed Spectrogram.

7. The device of claim 1, wherein a plurality of values in the Encoded Spectrogram comprise a value of 0; and wherein the device further compresses the Encoded Spectrogram prior to transmitting to the remote server by removing at least a portion of the plurality of values that comprise a value of 0.

8. The device of claim 7, wherein zero run-length encoding is used to compress the Encoded Spectrogram.

9. A method of detecting an audio signal and transmitting a compressed spectrogram to a remote server, comprising:
  receiving a plurality of digitized audio samples;
  using the plurality of digitized audio samples to create a spectrogram;
  generating a first column of an Encoded Spectrogram by applying a spectral conversion algorithm on a first column of the spectrogram;
  generating each subsequent column of the Encoded Spectrogram by applying the spectral conversion algorithm to a difference between a respective column of the spectrogram and values that correspond to a previous column of the Spectrogram; and
  transmitting the Encoded Spectrogram to the remote server.

10. The method of claim 9, wherein the values that correspond to the previous column are the values in the previous column of the spectrogram.

11. The method of claim 9, further comprising:
  creating a Reconstructed Spectrogram, wherein a $N^{th}$ column of the Reconstructed Spectrogram is generated by performing an inverse spectral conversion algorithm on a sum of a first N columns of the Encoded Spectrogram; and
  wherein the values that correspond to the previous column are the values in the previous column of the Reconstructed Spectrogram.

12. The method of claim 9, wherein the spectral conversion algorithm comprises a Discrete Cosine Transform.

13. The method of claim 9, further comprising:
  replacing a value in the column of the Encoded Spectrogram with a zero if the value is less than a predefined threshold using a NullandQuantize_Coefficient function.

14. The method of claim 13, further comprising:
  creating a Reconstructed Spectrogram, wherein a $N^{th}$ column of the Reconstructed Spectrogram is generated by performing an inverse spectral conversion algorithm on a sum of a first N columns of the Encoded Spectrogram, wherein the inverse spectral conversion algorithm is performed after the NullandQuantize_Coefficient function.

15. The method of claim 9, wherein a plurality of values in the Encoded Spectrogram comprise a value of 0; and wherein the method further comprises:
  compressing the Encoded Spectrogram prior to transmitting to the remote server by removing at least a portion of the plurality of values that comprise a value of 0.

16. A software program, disposed on a non-transitory storage media, comprising instructions, which when executed by a processing unit disposed on a device having a microphone, enable the device to:
  receive a plurality of digitized audio samples;
  use the plurality of digitized audio samples to create a spectrogram;
  generate a first column of an Encoded Spectrogram by applying a spectral conversion algorithm on a first column of the spectrogram;
  generate each subsequent column of the Encoded Spectrogram by applying the spectral conversion algorithm to a difference between a respective column of the spectrogram and values that correspond to a previous column of the Spectrogram; and
  transmit the Encoded Spectrogram to a remote server.

17. The software program of claim 16, further comprising instructions that enable the device to:
  create a Reconstructed Spectrogram, wherein a $N^{th}$ column of the Reconstructed Spectrogram is generated by performing an inverse spectral conversion algorithm on a sum of a first N columns of the Encoded Spectrogram; and wherein the values that correspond to the previous column are the values in the previous column of the Reconstructed Spectrogram.

18. The software program of claim 16, further comprising instructions that enable the device to:
  replace a value in the column of the Encoded Spectrogram with a zero if the value is less than a predefined threshold using a NullandQuantize_Coefficient function.

19. The software program of claim 16, wherein a plurality of values in the Encoded Spectrogram comprise a value of 0; and wherein the software program further comprises instructions that enable the device to:
  compress the Encoded Spectrogram prior to transmitting to the remote server by removing at least a portion of the plurality of values that comprise a value of 0.

20. The software program of claim 16, wherein the spectral conversion algorithm comprises a Discrete Cosine Transform.

* * * * *